United States Patent [19]
Josephs

[11] Patent Number: 5,175,627
[45] Date of Patent: Dec. 29, 1992

[54] ADJUSTABLE TELEVISION MASK

[76] Inventor: David R. Josephs, 2843 N. Clark St. #3F, Chicago, Ill. 60657

[21] Appl. No.: 688,667

[22] Filed: Apr. 22, 1991

[51] Int. Cl.5 .............................................. H04N 5/30
[52] U.S. Cl. .................................................. 358/255
[58] Field of Search ................................... 358/11-12, 358/180, 225, 239, 253, 255, 142

[56] References Cited

U.S. PATENT DOCUMENTS

| | | | |
|---|---|---|---|
| 2,751,583 | 6/1956 | Jones | 358/254 |
| 4,556,906 | 12/1985 | Dischert et al. | 358/180 |
| 4,567,508 | 1/1986 | Hulyer | 358/11 |

FOREIGN PATENT DOCUMENTS 491886 3/1937 United Kingdom.

Primary Examiner—Stephen Brinich
Attorney, Agent, or Firm—Niro, Scavone, Haller & Niro

[57] ABSTRACT

An adjustable television mask used to cover the "black bars" present on a television screen during broadcast of a signal transmitted in "letterbox" or "wide-screen" format. The invention includes four members that connect together to form a frame-like structure with an aperture therein. The desired portion of the transmission may be viewed while the "black bars" are blocked from view. The mask may be adjusted so the desired picture appearing on the screen fits exactly within the aperture formed by the mask. As a result, the viewing enjoyment of transmissions in "letterbox" or "wide-screen" formats can be significantly improved.

17 Claims, 2 Drawing Sheets

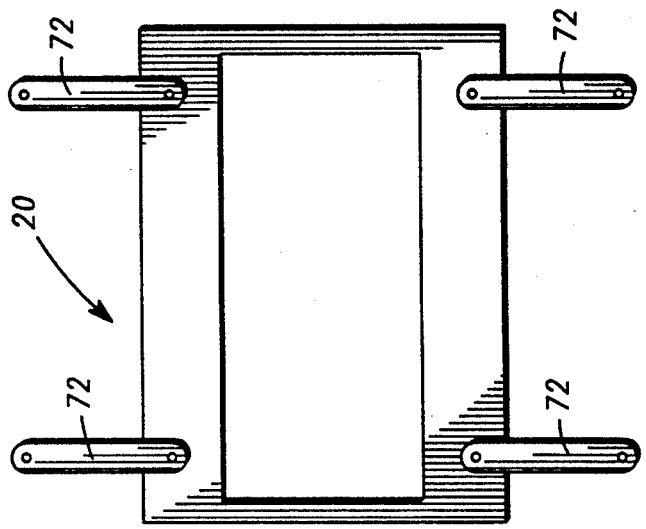
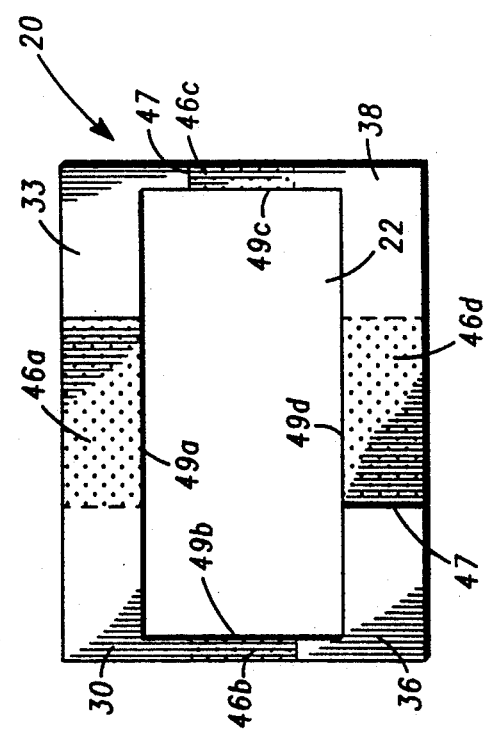
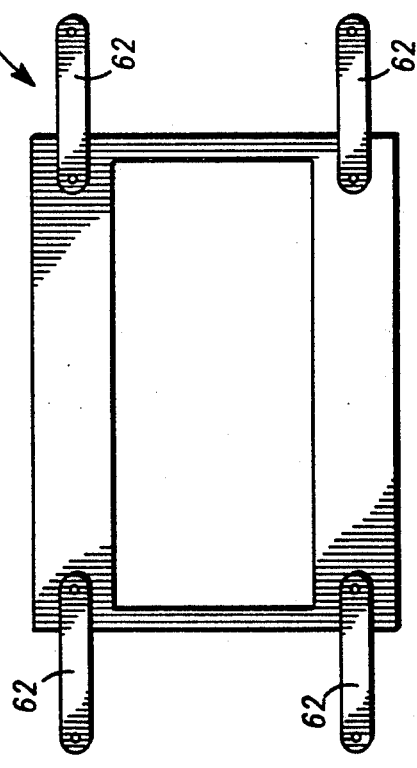

ADJUSTABLE TELEVISION MASK

BACKGROUND OF THE INVENTION

Ever since the first film was made available for either purchase or rental many years ago, the consumer has thrived for more and more movies, films and programming to fully take advantage of home media technology. The present technology includes videotape as well as laser disc formats. These film purchase an rental markets make up a large percentage of the film business that exists today. As a result, most films that are shown in movie theaters are later released on videotape to realize further profits.

Today, most films are shot in a wide-screen or 70 mm format. One such wide-screen format is called CINEMASCOPE. A problem arises when it comes time to transferring a wide-screen film to video tape or laser disc to later be seen on a television. The problem is that the wide-screen picture has approximately a 2:1 (horizontal:vertical) aspect ratio while a conventional home television has approximately a 4:3 aspect ratio. In order to transfer a wide-screen film to video tape or to laser disc, the film must be either "panned and scanned" (or cropped) so the entire screen is filled. An alternative to this process is the transfer to video tape in "letterbox" format.

Letterbox format is a version where the entire wide-screen film has been transferred to the video tape or laser disc in its original aspect ratio. Consumer viewing in this format is preferred by many because the entire film has been transferred, no portion of the film has been cropped out. As a result, the consumer can view the film exactly how it appeared in the movie theater.

However, there is a serious drawback in the viewing of letterboxed films, there are two black bars present above and below the picture. Even though the bars are black, there is still some luminescence emitted from the screen causing the viewer to be distracted in knowing that his or her screen is not completely filled up. Many viewers of video tape, laser discs and other like formats desire the letterbox version of a film but find the black bars annoying and difficult to get used to.

SUMMARY OF THE INVENTION

The present invention relates to a device for masking the black bars present in any letterbox version of a film on video tape or laser disc or any other recorded medium for playback on a television or monitor. Use of the present invention will prevent the distraction associated with watching films in the letterbox format.

The present invention involves an adjustable mask that can be affixed to a television screen or monitor. The mask includes a number of members that can be attached together to form a structure that substantially corresponds to the shape of a television screen. The structure formed by the members creates an aperture therebetween of a substantially rectangular shape which corresponds to a picture from a letterbox format input.

Since there are various degrees of letterboxing where the width of the horizontal black bars above and below the picture vary, the mask of the present invention has the ability to adjust in the vertical direction so that the picture on the screen from the letterbox format input fits exactly in the aperture created by the mask of the present invention. Mask aperture width adjustment in the horizontal direction is also possible with the present invention to ensure that the letterbox picture is precisely surrounded by the mask in all directions.

Once the mask is adjusted, there is provided a means for securing each member together to preserve a desired mask shape with a desired aperture therein. A means is also provided for attaching and securing the adjustable mask of the present invention to a television screen or monitor or the like.

When the adjustable mask is secured on the screen of a television or monitor, a letterbox picture can be viewed without the presence of black bars above and below the picture that is desired to be viewed.

BRIEF DESCRIPTION OF THE DRAWINGS

FIG. 4 shows a front view of a mask of the present invention in assembled form showing the overlap of the component parts.

FIGS. 5A and 5B show side views of a connection point of two component parts of the invention.

FIG. 6 shows a front view of an assembled mask of the present invention with horizontal attachment straps.

FIG. 7 shows a front view of an assembled mask of the present invention with vertical attachment straps.

DETAILED DESCRIPTION OF THE PREFERRED EMBODIMENT

Figure 1:
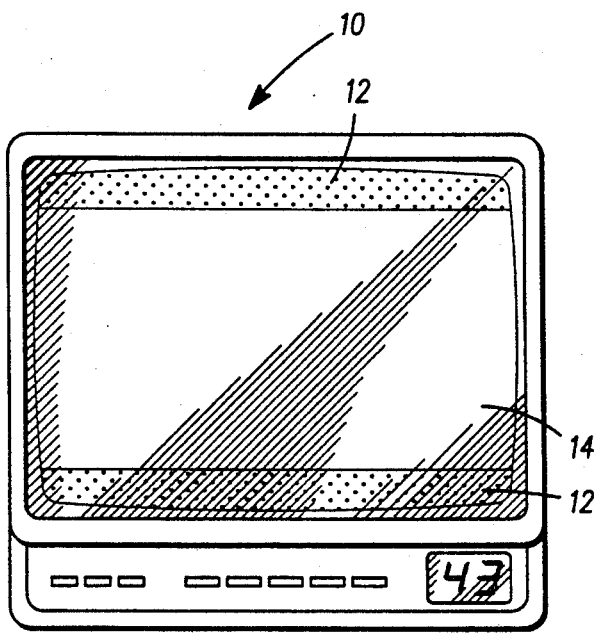
FIG. 1 shows a front view of a television screen displaying a signal in letterbox or wide-screen format.

As shown in FIG. 1, television screen 10 displays a transmission in letterbox or wide-screen format. The resultant picture on screen 10 has desired portion 14 and black bars 12. The desired portion 14 represents the actual moving picture of a displayed program while the blacks bars 12 represent the unused portion of the screen in a letterbox format program.

Figure 2:
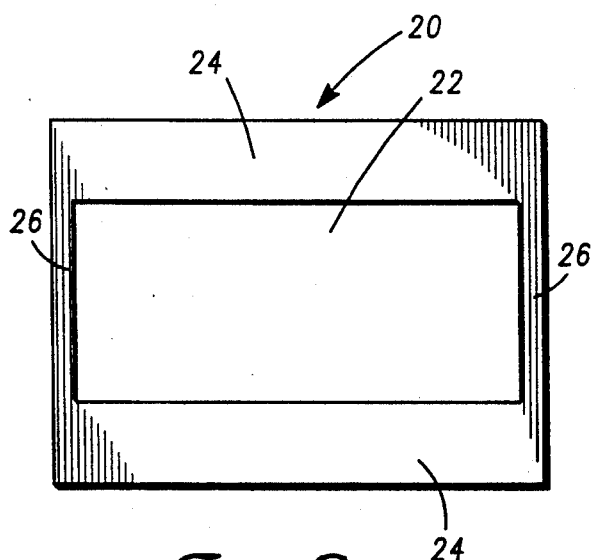
FIG. 2 shows a front view of an assembled mask of the present invention.
Figure 3C:
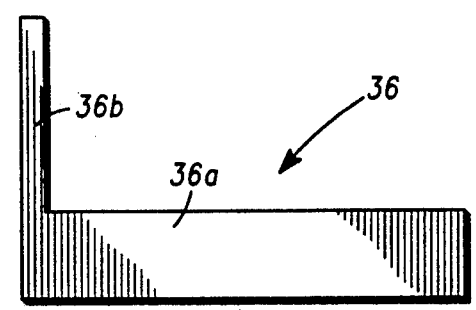
Figure 3D:
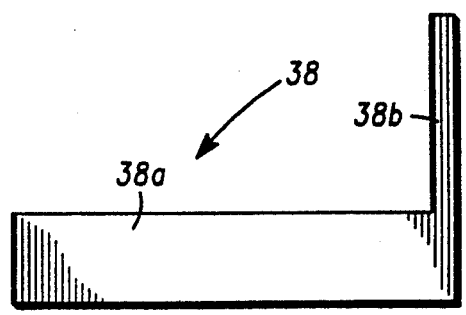

Moving to FIG. 2, a mask 20 of the present invention is shown in assembled form. The mask 20 is constructed to be placed directly over screen 10. The mask includes two horizontal portions 24 and two vertical portions 20. In assembled form, the mask creates a frame-like structure with an aperture 22 therein. The mask 20 is of such dimensions that it fits directly over screen 10. With the mask 20 in place over the screen 10, the desired portion 14 may be seen through the mask 20 unobstructed while the black bars 12 are completely masked from view. The horizontal portions 24 serve to block the black bars 12 and the vertical portions 20 sit on the vertical sides of the desired portion 14 without blocking any portion of the desired portion 14.

The mask 20 of the present invention has the advantage of a four side mask effect. Horizontal masking, by horizontal portions 24, are necessary to block the black bars 12 but the invention also includes vertical masking, by vertical portions 26, to give a continuity of the mask effect of the mask 20. The four side mask effect completely frames the desired portion 14 to give a cleaner looking screen to view.

Figure 3A:
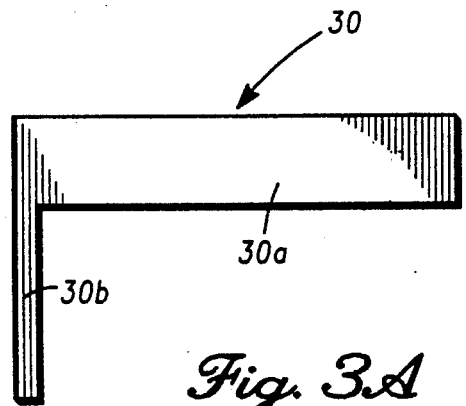
FIGS. 3A-3D show the basic component parts of the present invention in unassembled form.
Figure 3B:
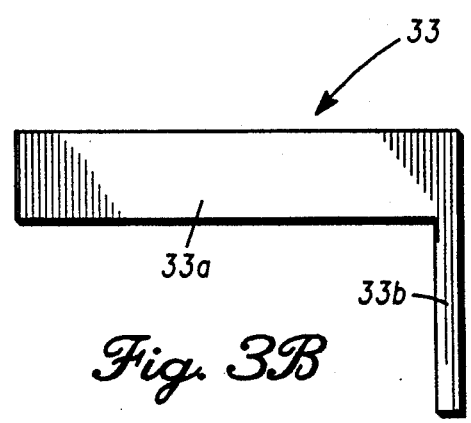

The mask 20 is shown in FIG. 2 as a complete structure. In FIGS. 3A-3D, the individual component parts that are used to construct the mask 20 are shown. It is preferable that each component is manufactured of a thin and semi-flexible plastic or the like. The mask components of 20 ma also be rigid and made of cardboard or heavy stock paper. Turning to FIG. 3A, upper-left component part 30 is shown. Upper left component part 30 forms the upper left corner portion of the mask 20. Upper right component part 33, shown in FIG. 3B, forms the upper right corner portion of mask 20. Lower left component part 36, shown in FIG. 3C, forms the lower left corner portion of mask 20. Lower right component part 38, shown in FIG. 3D, forms the lower right corner portion of mask 20. As will be discussed below, each of the four component parts, 30, 33, 36, and 38 fit together to form a complete mask 20.

FIG. 4 shows an assembled mask 20 with shaded overlapping portions of the component parts. Portion 30a of Upper left component part 30, overlaps with portion 33a of upper right component part 33 in region 46a. In region 46a, it is preferable that upper left component part 30 has VELCRO on its back side to engage with VELCRO present on the front side of upper right component part 33. Both parts 30 and 33 are connected together to form a even and flush top horizontal edge 49a.

FIG. 4 shows portion 36a of lower left component part 36 overlapping with portion 38a of lower right component part 38 in region 46d. In region 46d, it is preferable that lower left component part 36 has VELCRO on its front side to engage with VELCRO on the backside of lower right component part 38. Both parts 36 and 38 are connected together to form an even and flush bottom horizontal edge 49d.

In similar fashion, portion 30b of upper left component part 30 overlaps with portion 36b of lower left component part 36 in region 46b. In region 46b, it is preferable that upper left component part 30 has VELCRO on its back side to engage with VELCRO on the front side of lower left component part 36. Both parts 30 and 36 are connected together to form an even and flush left vertical edge 49b.

Portion 33b of upper right component part 33 overlaps with portion 38b of lower right component part 38 in region 46c. In region 46c, it is preferable that upper right component part 33 has VELCRO on its front side to engage with VELCRO on the back side of lower right component part 38. Both parts 33 and 38 are connected together to form an even and flush right vertical edge 49c.

The four component parts 30, 33, 36 and 38 can be assembled to form mask 20 in any order. The completely assembled mask 20 forms a resultant aperture 22 therein. The assembly and connection of the parts will vary according to the desired aperture or size of desired portion 14. The amount of overlap of the component parts can be varied to form a mask with various sized apertures. The adjustability of the present invention is essential for the accommodation of programs in slightly different aspect ratios. With the present invention, the mask 20 can be adjusted to enable a desired portion 14 to fit precisely within the aperture 22. The overall size of the mask 20 and its component parts can be modified to accommodate television screens of varying sizes.

FIGS. 5A and 5B show cross-sections of a component part overlap area illustrating the means for connecting them together. FIG. 5A shows one component part 50 connected to another component part 54 by a layer of VELCRO 52. Alternatively, each component part may be magnetized to provide a magnetized means for connecting the component parts together. Such an embodiment is shown in FIG. 5B. In FIG. 5B, component parts 50 and 54 directly touch one another. In similar fashion, the component parts may be made of slick plastic that adheres to other component parts made of the same material. Also, a sticky or adhesive material may be provided on the component parts to provide a means for connecting them together.

In FIGS. 6 and 7, means are shown for affixing the mask 20 to a television. FIG. 6 shows horizontal attachment while FIG. 7 shows vertical attachment. There are many available methods for affixing an object to a television screen of which the means in FIGS. 6 and 7 are two. Tabs 62 and 72 may be attached to the component parts of mask 20 or integral extensions of the component parts themselves. The tabs 62 and 72 may have VELCRO on them or be VELCRO strips which attach to a corresponding patch of VELCRO (not shown) on the side or top of the television cabinet. A combination of vertical and horizontal tabs may be used. Such an arrangement of tabs will effectively secure the assembled mask 20 to television screen 10.

It will be appreciated by those skilled in the art that various modifications and changes can be made to the illustrated embodiments without departing from the spirit and scope of the present invention. All such modifications and changes are intended to be covered by the appended claims.

I claim:

1. An adjustable television mask for masking a screen of a television displaying a program in letterbox format having a desired portion and an undesired portion, comprising:

means for adjustably mashing said undesired portion of said program in letterbox format from view;

means for adjustably allowing said desired portion of said program to be viewed;

means for affixing said means for adjustably masking to a television screen.

2. An adjustable television mask, as claimed in claim 1, for adjustably masking a screen of a television displaying a program in letterbox format having a desired portion and an undesired portion, wherein said means for adjustably masking said undersired portion of said program in letterbox format from view is at least one member disposed to mask said undesired portion.

3. An adjustable television mask, as claimed in claim 1, for adjustably masking a screen of a television displaying a program in letterbox format having a desired portion and an undesired portion, wherein said means for adjustably masking said undesired portion of said program in letterbox format from view includes a plurality of members connected together to form a substantially rectangular frame-like structure forming an aperture therein.

4. An adjustable television mask, as claimed in claim 3, for adjustably masking a screen of a television displaying a program in letterbox format having a desired portion and an undesired portion, wherein said aperture substantially corresponds to said desired portion of said program in letterbox format allowing said desired portion of said program in letterbox format to be viewed therethrough;

5. An adjustable television mask, as claimed in claim 4, for adjustably masking a screen of a television displaying a program in letterbox format having a desired portion and an undesired portion, wherein said plurality of members may be connected together in adjustable fashion to permit adjustment of the size and shape of said frame-like structure and said aperture to substantially correspond with said program in letterbox format.

6. An adjustable television mask, as claimed in claim 3, for masking a screen of a television displaying a program in letterbox format having a desired portion and an undesired portion, wherein said members are connected together by use of VELCRO adhered to portions of said members that are desired to be connected together.

7. An adjustable television mask, as claimed in claim 3, for masking a screen of a television displaying a program in letterbox format having a desired portion and an undesired portion, wherein said members are fabricated of a magnetic material so that they may be connected together due to magnetic attraction to one another.

8. An adjustable television mask, as claimed in claim 4, for masking a screen of a television displaying a program in letterbox format having a desired portion and an undesired portion, wherein said means for masking is affixed to said screen by at least one strip of VELCRO applied to said members and connected to a patch of VELCRO present on said television.

9. An adjustable television mask for masking a screen of a television displaying a program in letterbox format having a desired portion and two horizontal undesired portions situated above and below said desired portion, comprising:

four substantially flat L-shaped members, each with two portions disposed at 90 degrees from one another;

means for connecting said portions of said L-shaped members to form a substantially rectangular frame-like mask with n aperture formed therein;

means for affixing said frame-like mask to a television.

10. An adjustable television mask, as claimed in claim 9, for masking a screen of a television displaying a program in letterbox format having a desired portion and an undesired portion, wherein said aperture substantially corresponds to said desired portion allowing said desired portion to be viewed and said mask block said horizontal undesired portions of said program from view.

11. An adjustable television mask, as claimed in claim 10, for masking a screen of a television displaying a program in letterbox format having a desired portion and an undesired portion, wherein said four members may be connected together to form a mask of varying sizes with a corresponding aperture of varying sizes formed therein.

12. An adjustable television mask, as claimed in claim 9, for masking a screen of a television displaying a program in letterbox format having a desired portion and an undesired portion, wherein said means for affixing is at least one strip of VELCRO applied to said members and connected to a patch of VELCRO present on said television.

13. An adjustable television mask for masking a screen of a television displaying a program in letterbox format having a desired portion and two horizontal undesired portions situated above and below said desired portion, comprising:

a first substantially flat L-shaped member including a vertical section and a horizontal section of a predetermined width and thickness disposed at 90 degrees from one another;

a second substantially flat L-shaped member including a vertical section and a horizontal section of a predetermined width and thickness disposed at 90 degrees from one another; said horizontal section of said second member is connected to said horizontal section of said first member;

a third substantially flat L-shaped member including a vertical section and a horizontal section of a predetermined width and thickness disposed at 90 degrees from one another; said vertical section of said third member is connected to said vertical section of said second member;

a fourth substantially flat L-shaped member including a vertical and a horizontal section of a predetermined width and thickness disposed at 90 degrees from one another; said horizontal section of said fourth member is connected to said horizontal section of said third member; and said vertical section of said fourth member is connected to said vertical section of said first member;

means for affixing said first, second, third, and fourth members in connected form to a television mask;

whereby said first, second, third, and fourth members in connected form creates a television mask that masks said two horizontal undesired portions from view while allowing said desired portion to be viewed.

14. An adjustable television mask, as claimed in claim 13, for masking a screen of a television displaying a program in letterbox format having a desired portion and two horizontal undesired portions situated above and below said desired portion, wherein said first, second, third, and fourth members in connected form creates a frame-like structure with an aperture created therein for allowing said desired portion of said program to be viewed therethrough.

15. An adjustable television mask, as claimed in claim 13, for masking a screen of a television displaying a program in letterbox format having a desired portion and two horizontal undesired portions situated above and below said desired portion, wherein said members are connected together in an adjustable overlapping fashion having a region of overlap with VELCRO disposed therebetween so members cannot easily separate, the size of the region of overlap of said members may be changed to adjust the overall size of said members in connected form.

16. An adjustable television mask, as claimed in claim 13, for masking a screen of a television displaying a program in letterbox format having a desired portion and two horizontal undesired portions situated above and below said desired portion, wherein said members are connected to one another in overlapping fashion and adhere to each other by magnetic attraction.

17. An adjustable television mask, as claimed in claim 13, for masking a screen of a television displaying a program in letterbox format having a desired portion and two horizontal undesired portions situated above and below said desired portion, wherein said means for affixing is a piece of VELCRO material attached to at least one of said members and engaged with a corresponding patch of VELCRO disposed on said television.

* * * * *